(12) United States Patent
Murayama et al.

(10) Patent No.: US 9,787,104 B2
(45) Date of Patent: Oct. 10, 2017

(54) POWER TRANSMISSION SYSTEM

(71) Applicant: IHI CORPORATION, Tokyo (JP)

(72) Inventors: Takahiko Murayama, Tokyo (JP); Yuji Maekawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 200 days.

(21) Appl. No.: 14/956,486

(22) Filed: Dec. 2, 2015

(65) Prior Publication Data
US 2016/0087457 A1    Mar. 24, 2016

Related U.S. Application Data

(63) Continuation of application No. PCT/JP2013/069177, filed on Jul. 12, 2013.

(51) Int. Cl.
| | |
|---|---|
| *H02J 50/00* | (2016.01) |
| *H02J 5/00* | (2016.01) |
| *H02J 17/00* | (2006.01) |
| *H02J 7/02* | (2016.01) |
| *H02M 3/04* | (2006.01) |
| *H02M 7/04* | (2006.01) |
| *H02M 7/44* | (2006.01) |
| *H02M 1/36* | (2007.01) |

(Continued)

(52) U.S. Cl.
CPC .............. *H02J 5/005* (2013.01); *H02J 7/025* (2013.01); *H02J 17/00* (2013.01); *H02J 50/12* (2016.02); *H02J 50/80* (2016.02); *H02M 1/36* (2013.01); *H02M 3/04* (2013.01); *H02M 7/04* (2013.01); *H02M 7/44* (2013.01)

(58) Field of Classification Search
CPC .... H02J 50/00; H02J 9/00; H02J 5/005; H02J 17/00; H02J 50/10; H02J 50/12; H02J 50/80
See application file for complete search history.

(56) References Cited

U.S. PATENT DOCUMENTS

| | | | |
|---|---|---|---|
| 6,449,172 B2 | 9/2002 | Nagahara | |
| 8,729,735 B2 * | 5/2014 | Urano | ................ H02J 5/005 307/104 |
| 9,154,003 B2 | 10/2015 | Ichikawa | |

(Continued)

FOREIGN PATENT DOCUMENTS

| | | |
|---|---|---|
| CN | 1309458 A | 8/2001 |
| CN | 102684319 A | 9/2012 |

(Continued)

OTHER PUBLICATIONS

International Search Report, PCT/JP2013/069177, dated Sep. 10, 2013, 1 pg.

(Continued)

*Primary Examiner* — Hai L Nguyen
(74) *Attorney, Agent, or Firm* — Volpe and Koenig, P.C.

(57) ABSTRACT

The power transmission system includes a power transmitting device that transmits AC power and a power receiving device that receives the AC power. The power transmitting device includes AC converters, a power-transmitting side resonance coil, and a power-transmitting side controller. The power receiving device includes a power-receiving side resonance coil, a rectifier, a DC converter, a power-receiving side controller, and a power-source circuit.

2 Claims, 2 Drawing Sheets

(51) Int. Cl.
*H02J 50/12* (2016.01)
*H02J 50/80* (2016.01)

(56) References Cited

U.S. PATENT DOCUMENTS

| | | |
|---|---|---|
| 9,225,391 B2 * | 12/2015 | Bae ................... H04B 5/0037 |
| 9,431,989 B2 * | 8/2016 | Deguchi ................ H01F 38/14 |
| 9,490,064 B2 | 11/2016 | Hirosawa et al. |
| 2001/0017779 A1 | 8/2001 | Nagahara |
| 2011/0053500 A1 | 3/2011 | Menegoli et al. |
| 2012/0201054 A1 | 8/2012 | Kitamura et al. |
| 2012/0235508 A1 | 9/2012 | Ichikawa |
| 2012/0306285 A1 | 12/2012 | Kim et al. |
| 2012/0326524 A1 | 12/2012 | Matsumoto et al. |
| 2014/0145516 A1 | 5/2014 | Hirosawa et al. |

FOREIGN PATENT DOCUMENTS

| | | | |
|---|---|---|---|
| CN | 102754304 | A | 10/2012 |
| CN | 202749913 | U | 2/2013 |
| EP | 2320538 | A2 | 5/2011 |
| JP | 2007-336717 | A | 12/2007 |
| JP | 2007-336787 | A | 12/2007 |
| JP | 2011-120443 | A | 6/2011 |
| JP | 2011-147271 | A | 7/2011 |
| JP | 2011-229265 | A | 11/2011 |
| JP | 2012-161145 | A | 8/2012 |
| WO | 2013/015416 | A1 | 1/2013 |
| WO | 2013/015416 | X | 2/2015 |

OTHER PUBLICATIONS

Japanese Office Action with English concise explanation, Japanese Patent Application No. 2012-085325, dated Oct. 7, 2014, 4 pgs.

\* cited by examiner

POWER TRANSMISSION SYSTEM

This application is a Continuation Application based on International Application No. PCT/JP2013/069177 filed on Jul. 12, 2013, the content of which is incorporated herein by reference.

TECHNICAL FIELD

The present disclosure relates to a power transmission system.

BACKGROUND ART

Wireless power supply methods such as an electromagnetic induction method, a radio wave receiving method, an electric field coupling method, and a magnetic field resonance method are known. Among these methods, the magnetic field resonance method relates to a technique in which each of the side of a power transmitting device and the side of a power receiving device includes an LC resonance circuit, which is made up of a coil and a capacitor, and a magnetic field between the two LC resonance circuits is resonated to wirelessly transmit electric power (see Japanese Unexamined Patent Application, First Publication No. 2011-147271 described below).

In comparison with the electromagnetic induction method that is widely put to practical use, the magnetic resonance method is possible to realize highly efficient and long-distance power transmission under a weak magnetic field, and is attracting attention as a next-generation wireless power transmission technique available for charging portable terminals, electric vehicles, and the like.

SUMMARY OF INVENTION

Technical Problem

The power transmission system of the wireless power supplying method (particularly, the magnetic field resonance method) is made up of a power transmitting device that amplifies alternating current power supplied from an alternating current power source using an amplifier and then wirelessly transmits the amplified alternating current power using a power transmitting side resonance coil, and a power receiving device that converts the alternating current power received by a power-receiving side resonance coil into direct current power using a rectifier and further converts the rectified direct current power into desired direct current power (e.g., charging power of a storage battery) using a direct current converter (DC-DC converter). At the side of the power receiving device, the rectifier and the direct current converter may be integrally incorporated to serve as a charger (AC-DC converter).

When the power transmission from the power transmitting device to the power receiving device is started, if an output voltage of the amplifier of the power transmitting device is raised in a state in which no impedance is matched (that is, in which no direct current converter does not operate), an output voltage of the rectifier at the side of the power receiving device may be influenced by a Q factor of the LC resonance circuit, and may be higher than the output voltage of the amplifier. Since a high voltage generated in this way is suddenly (several seconds or less) applied to the direct current converter in a stage subsequent to the rectifier, the generated high voltage may exceed a withstanding voltage value of the direct current converter and damage the direct current converter.

In addition, in a state in which power (control power) is not applied to a control device such as a microcomputer for controlling the direct current converter, or in a state in which the control device is unstable when started, a high voltage may be applied to the direct current converter, and unexpected trouble such as overrun of the direct current converter may occur. To avoid such overrun of the direct current converter, a power storage device such as a storage battery or a capacitor for supplying the control power needs to be separately prepared, which leads to a rise in cost.

The present disclosure is conceived in view of the above-described circumstances, and an object of the present disclosure is to provide a power transmission system capable of preventing damage to a direct current converter provided in a stage subsequent to a rectifier at a side of a power receiving device without separately preparing a power storage device.

Solution to Problem

To achieve the aforementioned object, according to a first aspect of the present disclosure, there is provided a power transmission system that includes: a power transmitting device configured to convert supplied alternating current (AC) or direct current (DC) power into AC power and transmit the converted AC power via a transmission path; and a power receiving device configured to receive the AC power via the transmission path. The power transmitting device includes: an AC converter configured to perform AC conversion on the supplied AC or DC power; a power transmitting side resonance coil configured to wirelessly transmit the AC power obtained from the AC converter under a magnetic field resonance method; and a power-transmitting side controller configured to control the AC converter. The power receiving device includes: a power-receiving side resonance coil configured to wirelessly receive the AC power from the power-transmitting side resonance coil; a rectifier configured to convert the AC power received by the power-receiving side resonance coil into the DC power; a DC converter configured to perform DC conversion on the DC power output from the rectifier; a power-receiving side controller configured to control the DC converter; and a power-source circuit configured to generate a control power voltage from an output voltage of the rectifier and output the generated control power voltage to the power-receiving side controller. The power-receiving side controller is configured to measure the output voltage of the rectifier after being activated by input of the control power voltage and to transmit a measurement result to the power-transmitting side controller. The power-transmitting side controller is configured to control the AC converter for a period from a transmission start time of the AC power to a time when the measurement result of the output voltage of the rectifier is received so that the output voltage of the rectifier is gradually raised, and, after receiving the measurement result, to control the AC converter based on the measurement result so that the output voltage of the rectifier becomes a suitable value as an input voltage of the DC converter According to a second aspect of the present disclosure, in the first aspect, the power-receiving side controller is configured to start to control the DC converter when the output voltage of the rectifier becomes the suitable value as the input voltage of the DC converter.

Advantageous Effects of Invention

According to the present disclosure, as the output voltage of the rectifier is gradually raised in a state in which impedance is not matched (that is, in a state in which the power converter does not operate) at the power transmission start time, it is possible to prevent damage to the power converter. After the power-receiving side controller is surely activated, as the output voltage of the rectifier becomes the suitable value as the input voltage of the DC converter, it is possible to prevent unexpected trouble such as overrun of the DC converter. In addition, no power storage device for preventing the overrun of the DC converter needs to be separately prepared, and a rise in cost can also be suppressed.

DESCRIPTION OF EMBODIMENTS

Hereinafter, an embodiment of the present disclosure will be described with reference to the drawings.

Figure 1:
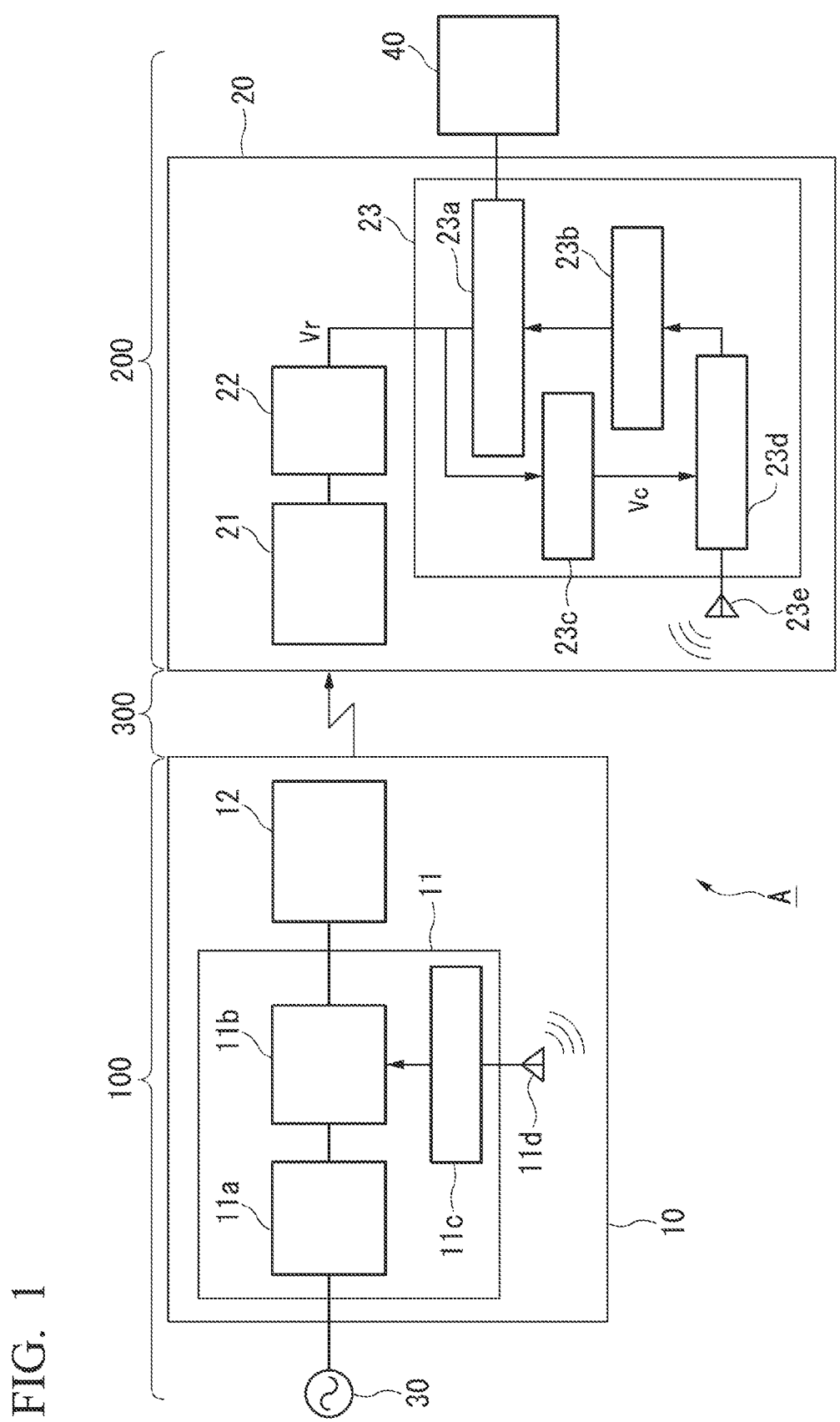
FIG. 1 is a schematic constitutional view of a power transmission system according to an embodiment of the present disclosure.

FIG. 1 is a schematic constitutional view of a power transmission system A according to the present embodiment. As shown in FIG. 1, the power transmission system A according to the present embodiment is, for instance, a power transmission system based on a wireless power supply system that wirelessly transmits charging power (alternating current (AC) power) from a charging facility 100 installed at a predetermined location such as in a parking lot to an electric vehicle 200 via a space transmission path (transmission path) 300. The power transmission system A includes a power transmitting device 10 mounted at the side of the charging facility 100, and a power receiving device 20 mounted at the side of the electric vehicle 200.

The power transmitting device 10 wirelessly transmits alternating current power supplied from an AC power source 30 (for example, a commercial power source having a single-phase voltage of 200 V and a frequency of 50 or 60 Hz) provided at the side of the charging facility 100 via the space transmission path 300. The power transmitting device 10 includes an amplifier 11 and a power-transmitting side resonator 12.

The amplifier 11 is an AC converting device that performs AC-AC conversion on the AC power supplied from the AC power source 30 and outputs the AC power obtained by the AC-AC conversion to the power-transmitting side resonance coil 12. To be specific, the amplifier 11 includes a rectifier circuit 11a that converts the AC power supplied from the AC power source 30 into direct current (DC) power, an inverter 11b that converts the DC power output from the rectifier circuit 11a into AC power having a predetermined voltage and a predetermined frequency and outputs the converted AC power to the power-transmitting side resonance coil 12, and a power-transmitting side controller 11c that performs pulse-width-modulation (PWM) control on a switching element such as a metal-oxide-semiconductor field-effect transistor (MOS-FET) constituting the inverter 11b. In the present embodiment, the rectifier circuit 11a and the inverter 11b are equivalent to an AC converter of the present disclosure.

The power-transmitting side controller 11c performs the PWM control on the switching element constituting the inverter 11b (that is, controls a duty cycle of the switching element) to control the voltage and frequency of the AC power output from the inverter 11b. In addition, the power-transmitting side controller 11c has a function of performing radio communication with a power-receiving side controller 23d (to be described below) using a short-range radio communication standard such as Bluetooth (registered trademark) via an antenna 11d.

The power-transmitting side resonance coil 12 is a helical coil wound in a spiral shape in order to wirelessly transmit the AC power input from the amplifier 11 via the space transmission path 300 under a magnetic field resonance method. The power-transmitting side resonance coil 12 constitutes an LC resonance circuit along with a capacitor (not shown).

As the capacitor for constituting the LC resonance circuit, parasitic capacitance of the helical coil may be used, or a capacitor element may be separately provided.

The power receiving device 20 wirelessly receives the AC power wirelessly transmitted from the power transmitting device 10 via the space transmission path 300, converts the received AC power into DC power for charging, and supplies the converted DC power to a storage battery 40 such as a lithium-ion battery mounted at the side of the electric vehicle 200. The power receiving device 20 includes a power-receiving side resonance coil 21, a rectifier 22, and a DC-DC converter 23.

The power-receiving side resonance coil 21 is a helical coil wound in a spiral shape in order to wirelessly receive the AC power from the power-transmitting side resonance coil 12 via the space transmission path 300. The power-receiving side resonance coil 21 constitutes an LC resonance circuit along with a capacitor (not shown). When each circuit constant is set so that resonance frequencies of the LC resonance circuits of the power transmitting 10 and the power receiving device 20 are equal to each other, it is possible to generate magnetic field resonance between the power-transmitting side resonance coil 12 and the power-receiving side resonance coil 21.

When the magnetic field resonance is generated, the AC power output from the amplifier 11 is converted into magnetic energy by the power-transmitting side resonance coil 12 and is wirelessly transmitted. The magnetic energy is reconverted into the AC power by the power-receiving side resonance coil 21. The AC power obtained from the power-receiving side resonance coil 21 is output to the rectifier 22 provided at the following stage. The rectifier 22 rectifies the AC power input from the power-receiving side resonance coil 21, that is, converts the AC power into DC power, and outputs the obtained DC power to the DC-DC converter 23.

The DC-DC converter 23 performs DC-DC conversion on the DC power input from the rectifier 22, and outputs the obtained DC power to the storage battery 40 as charging DC power. To be specific, the DC-DC converter 23 includes a step-down switching circuit (DC converter) 23a that steps down the DC power input from the rectifier 22 depending on an on-off action of a switching element such as a MOSFET, a gate drive circuit 23b that generates a gate signal for turning on or off the switching element, a regulator (power-source circuit) 23c that generates a control power voltage Vc from an output voltage Vr of the rectifier 22 and outputs the generated control power voltage Vc to the power-receiving side controller 23d, and the power-receiving side controller 23d that performs the PWM control on the switching element of the step-down switching circuit 23a via the gate drive circuit 23b. The step-down switching circuit 23a is a circuit that performs the DC conversion on the DC power output from the rectifier 22 and is equivalent to the DC converter of the present disclosure.

The power-receiving side controller 23d includes an antenna 23e and has a function of performing radio communication with the power-transmitting side controller 11c using a short-range radio communication standard such as Bluetooth (registered trademark). After the power-receiving side controller 23d is activated by the input of the control power voltage Vc from the regulator 23c, the power-receiving side controller 23d measures the output voltage Vr of the rectifier 22 and transmits a measurement result to the power-transmitting side controller 11c. The power-transmitting side controller 11c controls the amplifier 11 (inverter 11b) so that the output voltage of the rectifier 22 is gradually raised for a period from a transmission start time of the AC power (that is, a time when transmission of the AC power starts between the power-transmitting side resonance coil 12 and the power-receiving side resonance coil 21) to a time when the measurement result of the output voltage Vr of the rectifier 22 is received from the power-receiving side controller 23d. After the power-transmitting side controller 11c receives the measurement result, the power-transmitting side controller 11c controls the amplifier 11 based on the measurement result so that the output voltage Vr of the rectifier 22 becomes a suitable value as the input voltage of the DC-DC converter 23.

Figure 2:
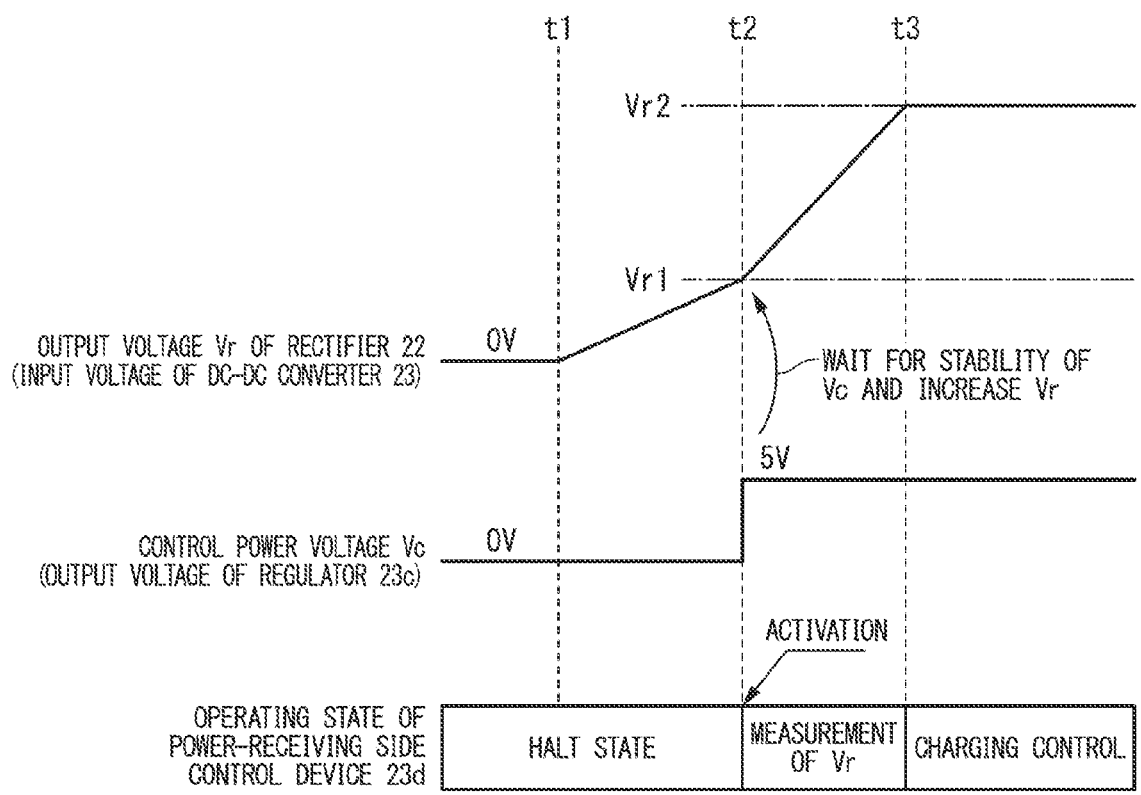
FIG. 2 is a timing chart showing a temporal correspondence relation among an output voltage of a rectifier (that is, an input voltage of a DC-DC converter), a control power voltage (that is, an output voltage of a regulator), and an operating state of a power-receiving side controller.

Next, an operation of the power transmission system A configured as described above according to the present embodiment will be described in detail with reference to FIG. 2. FIG. 2 is a timing chart showing a temporal correspondence among the output voltage Vr of the rectifier 22 (that is, the input voltage of the DC-DC converter 23), the control power voltage Vc (that is, the output voltage of the regulator 23c), and an operating state of the power-receiving side controller 23d.

When the electric vehicle 200 stops near a location at which the charging facility 100 is installed, the power-transmitting side controller 11c of the power transmitting device 10 starts to perform the PWM control on the amplifier 11 so that the output voltage Vr of the rectifier 22 is gradually raised from the transmission start time t1 of the AC power which is shown in FIG. 2. As a result, at the side of the power transmitting device 10, the AC power depending on the PWM control by the power-transmitting side controller 11c is output from the amplifier 11 to the power-transmitting side resonance coil 12, and magnetic field resonance is generated between the power-transmitting side resonance coil 12 and the power-receiving side resonance coil 21.

When the magnetic field resonance is generated, the AC power output from the amplifier 11 is transmitted (wirelessly transmitted) from the power-transmitting side resonance coil 12 to the power-receiving side resonance coil 21. At the side of the power-receiving device 20, the AC power received by the power-receiving side resonance coil 21 is converted into DC power by the rectifier 22 and is input to the DC-DC converter 23. At this point of time, the power-transmitting side controller 11c does not receive a measurement result of the output voltage Vr of the rectifier 22 from the power-receiving side controller 23d, and thus controls the amplifier 11 (inverter 11b) so that the output voltage of the rectifier 22 is gradually raised. Accordingly, as shown in FIG. 2, the output voltage Vr of the rectifier 22 is gradually raised over time from the transmission start time t1.

In FIG. 2, the control power voltage Vc output from the regulator 23c is 0 V (ground level) for a period from the transmission start time t1 to time t2 when the output voltage Vr of the rectifier 22 rises to an operable voltage Vr1 of the regulator 23c, and the power-receiving side controller 23d is a halt state. When the output voltage Vr of the rectifier 22 rises to the operable voltage Vr1 of the regulator 23c at the time t2, the regulator 23c starts to operate at the time t2. Due to the operation of the regulator 23c, the control power voltage Vc is sharply raised to the 5 V required as the source voltage for the power-receiving side controller 23d.

When the control power voltage Vc of 5 V is output from the regulator 23c to the power-receiving side controller 23d at the time t2, the power-receiving side controller 23d is activated from the halt state. The activated power-receiving side controller 23d measures the output voltage Vr of the rectifier 22 in a given control cycle (transmission cycle) after the time t2 and transmits a measurement result to the power-transmitting side controller 11c. When the power-transmitting side controller 11c receives the measurement result of the output voltage Vr of the rectifier 22 from the power-receiving side controller 23d, the power-transmitting side controller 11c performs PWM control on the amplifier 11 based on the measurement result so that the output voltage Vr of the rectifier 22 becomes a suitable value as the input voltage of the DC-DC converter 23 (that is, the value is an operable voltage Vr2 of the DC-DC converter 23).

As a result, as shown in FIG. 2, the output voltage Vr of the rectifier 22 rises toward the operable voltage Vr2 of the DC-DC converter 23 from the time t2. When the output voltage Vr of the rectifier 22 reaches the operable voltage Vr2 of the DC-DC converter 23 at time t3, the power-receiving side controller 23d starts control of the DC-DC converter 23, that is, charging control of the storage battery 40. The power-receiving side controller 23d transmits a notification that the output voltage Vr of the rectifier 22 reaches the operable voltage Vr2 of the DC-DC converter 23 to the power-transmitting side controller 11c. With the reception of the notification, the power-transmitting side controller 11c performs the PWM control on the amplifier 11 so that the output voltage Vr of the rectifier 22 is constant at Vr2.

As described above, according to the present embodiment, as the output voltage Vr of the rectifier 22 is gradually raised in a state in which the impedance is not matched (that is, in a state in which the DC-DC converter 23 does not operate) at the power transmission start time, it is possible to prevent damage to the devices, components, and the like of the entire system including the DC-DC converter 23. After the power-receiving side controller 23d is surely activated, as the output voltage Vr of the rectifier 22 is raised to the operable voltage Vr2 of the DC-DC converter 23, it is possible to prevent unexpected trouble such as overrun of the DC-DC converter 23. In addition, no power storage device for preventing the overrun of the DC-DC converter 23 needs to be separately prepared, and a rise in cost can also be suppressed.

The present disclosure is not limited to the aforementioned embodiment, but is limited only by the appended claims. All the shapes and combinations of the components shown in the aforementioned embodiment are only examples, and additions, omissions, substitutions, and other modifications of the constitution are possible based on, for instance, design requirements without departing from the present disclosure. For example, the following modifications are given.

For example, in the aforementioned embodiment, the power transmission system A based on the wireless power supply method that wirelessly transmits the charging power (AC power) from the charging facility 100 to the electric vehicle 200 via the space transmission path 300 is given by way of example. However, the present disclosure is not limited thereto. For example, the present disclosure may also be applied to a power transmission system that transmits power to a portable terminal using the wireless power supply system and charges a battery of the portable terminal. In addition, without being limited to the DC-DC converter 23, the present disclosure may also be applied to another secondary side device (power-receiving side device). Further, the amplifier 11 may include power factor correction (PFC) as needed.

In the aforementioned embodiment, the example in which the power source provided at the side of the charging facility 100 is the AC power source 30 is given. However, when the power source is a DC power source, that is, when the DC power is supplied from the power source to the power transmitting device 10, the rectifier circuit 11a may be removed from the amplifier 11. That is, the DC power may be directly supplied from the power source to the inverter 11b (in this case, the inverter 11b is equivalent to the AC converter of the present disclosure). Also, a system in which AC power or DC power is supplied from anything other than a power source may be configured.

The activation of the power-receiving side controller 23d starts at the time t2; however, a predetermined time (activation time) may be required from the time t2 to the completion of activating the power-receiving side controller 23d. In this case, the measurement result of the power-receiving side controller 23d with respect to the output voltage Vr of the rectifier 22 is not transmitted to the power-transmitting side controller 11c until the activation time has elapsed from the time t2. For this reason, the output voltage Vr gradually continues to rise at the same increment rate as that between the time t1 and the time t2 until the activation time has elapsed from the time t2. Accordingly, the increment rate of the output voltage Vr between the time t1 and the time t2 is preferably set so that the output voltage Vr does not exceed the operable voltage Vr2 (or the withstanding voltage value of the step-down switching circuit 23a) until the activation time has elapsed.

INDUSTRIAL APPLICABILITY

The present disclosure can be applied to a power transmission system in which power can be supplied wirelessly.

The invention claimed is:
1. A power transmission system comprising:
a power transmitting device configured to convert supplied alternating current (AC) or direct current (DC) power into AC power and transmit the converted AC power via a transmission path; and
a power receiving device configured to receive the AC power via the transmission path,
wherein the power transmitting device comprises:
an AC converter configured to perform AC conversion on the supplied AC power or DC power;
a power-transmitting side resonance coil configured to wirelessly transmit the AC power obtained from the AC converter under a magnetic field resonance method; and
a power-transmitting side controller configured to control the AC converter,
wherein the power receiving device comprises:
a power-receiving side resonance coil configured to wirelessly receive the AC power from the power-transmitting side resonance coil;
a rectifier configured to convert the AC power received by the power-receiving side resonance coil into the DC power;
a DC converter configured to perform DC conversion on the DC power output from the rectifier;
a power-receiving side controller configured to control the DC converter; and
a power-source circuit configured to generate a control power voltage from an output voltage of the rectifier and output the generated control power voltage to the power-receiving side controller,
wherein the power-receiving side controller is configured to measure the output voltage of the rectifier after being activated by input of the control power voltage and to transmit a measurement result to the power-transmitting side controller, and
wherein the power-transmitting side controller is configured to control the AC converter for a period from a transmission start time of the AC power to a time when the measurement result of the output voltage of the rectifier is received so that the output voltage of the rectifier is gradually raised, and, after receiving the measurement result, to control the AC converter based on the measurement result so that the output voltage of the rectifier becomes a suitable value as an input voltage of the DC converter.
2. The power transmission system according to claim 1, wherein the power-receiving side controller is configured to start to control the DC converter when the output voltage of the rectifier becomes the suitable value as the input voltage of the DC converter.

* * * * *